United States Patent
Murphy et al.

(10) Patent No.: US 7,410,359 B1
(45) Date of Patent: Aug. 12, 2008

(54) ELECTROMECHANICAL TACTILE CELL ASSEMBLY

(75) Inventors: Patrick Murphy, Riverview, FL (US); Todd Conard, Ruskin, FL (US); Waldemar H Tunkis, Palm Harbor, FL (US); Michael Goldenberg, Melbourne, FL (US); Carlos M Rodriguez, Palm Harbor, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 813 days.

(21) Appl. No.: 10/711,423

(22) Filed: Sep. 17, 2004

Related U.S. Application Data

(60) Provisional application No. 60/481,979, filed on Jan. 30, 2004.

(51) Int. Cl.
G09B 21/00 (2006.01)
(52) U.S. Cl. ..................................................... 434/114
(58) Field of Classification Search ................. 434/112, 434/113, 114, 115, 117; 340/407.1
See application file for complete search history.

(56) References Cited

U.S. PATENT DOCUMENTS

| | | | | |
|---|---|---|---|---|
| 4,283,178 A | * | 8/1981 | Tetzlaff | 434/114 |
| 4,633,121 A | * | 12/1986 | Ogawa et al. | 310/332 |
| 5,226,817 A | * | 7/1993 | Nakajima et al. | 434/113 |
| 5,766,014 A | * | 6/1998 | Ida et al. | 434/114 |
| 5,842,867 A | * | 12/1998 | Hong et al. | 434/114 |
| 6,109,922 A | * | 8/2000 | Litschel et al. | 434/114 |
| 6,217,338 B1 | * | 4/2001 | Tieman | 434/114 |
| 6,354,839 B1 | * | 3/2002 | Schmidt et al. | 434/113 |
| 6,693,516 B1 | * | 2/2004 | Hayward | 340/407.1 |
| 6,881,063 B2 | * | 4/2005 | Yang | 434/114 |
| 7,018,209 B2 | * | 3/2006 | Schleppenbach et al. | 434/114 |

* cited by examiner

*Primary Examiner*—Kurt Fernstrom
(74) *Attorney, Agent, or Firm*—Holland & Knight LLP

(57) ABSTRACT

The present invention discloses an electromechanical tactile cell assembly comprising a plurality of piezoelectric element reeds, each one of the piezoelectric element reeds being bendable at an elongated end portion when a voltage is applied to the reed, a plurality of conductive fulcrum pins secured to a printed circuit board, and a plurality of multiple element conductive supports secured to a printed circuit board, each multiple element conductive support, in combination with the plurality of conductive fulcrum pins, adapted to secure a plurality of piezoelectric reeds, corresponding to the plurality of conductive fulcrum pins, to the printed circuit board. The electromechanical tactile cell is adaptable for use with a Braille display.

24 Claims, 5 Drawing Sheets

ELECTROMECHANICAL TACTILE CELL ASSEMBLY

CROSS REFERENCE TO RELATED APPLICATION

This application claims priority to Provisional Patent Application No. 60/481,979 filed, Jan. 30, 2004.

BACKGROUND OF INVENTION

A Braille display is an electromechanical device that connects to a computer by way of a serial or parallel cable. The display consists of a line of electromechanical tactile cells, each with six or eight pins that move up and down to represent the dots of a Braille cell. The display is used to represent a line of text on a computer screen. Each cell has six or eight tactile pins that are driven by electromechanical or piezoelectric effects. The user of the display is able to read a line of Braille cells by touching the pins of each cell as they are extended above a tactile surface. After a line has been read the user can refresh the display to allow for additional lines to be presented and read. Braille displays are often combined with other hardware and software to make up an integrated unit. For instance Braille displays are connected to video monitors to serve as the display unit, and many units incorporate speech output of the screen prompts.

Electromechanical tactile cells for use in refreshable Braille displays and graphical tactile displays are known in the art. An exemplary tactile cell as known in the art consists of eight piezoelectric reed elements corresponding to eight tactile pins. The necessary electrical connections and driving forces are provided to actuate the reeds, thereby causing the tactile pins to protrude above a tactile surface to allow the Braille character or graphic element to be displayed. The Braille cells known in the art have not been designed for manufacturability and ease of repair and replacement.

The present state of the art employs serial polled piezoelectric bimorph reeds to drive the tactile pins. The bimorph reeds have a common center conductor positioned between two piezoelectric transducers. Series polled bimorph reeds are used as actuators, wherein the top and bottom elements are polled towards the center element upon initial manufacturing. With this configuration, the common center point is grounded and voltage is applied to the outer strips. A simple circuit drives the center conductor and fixes the outer conductor. This series polled arrangement drives only one piezo element and the opposing element performs as a mechanical drag. This arrangement additionally requires that special metallic plating be applied to the outer piezoceramic contacts to enable soldering of the leads to the printed circuit board. The need for such special metallic plating and individual attachment of the leads increases the manufacturing costs associated with each Braille cell. Current technology requires the use of sixteen hand-soldered leads, requiring thirty two hand-soldered solder joints to establish the electrical connections for each Braille cell in the display. Precise positioning of the reeds is necessary to ensure that the tactile pins extend a definite distance beyond the tactile surface upon actuation of the reed and fully retract below the surface upon request. This precise positioning and alignment of the reeds with the upward trajectory of the tactile pins proves to be very difficult with hand-soldering manufacturing techniques. Additionally, replacement of the reeds for repair of the Braille cell is complicated due to the large number of hand-soldered leads employed in the design.

Prior art Braille cells employ one individual tactile pin cap per individual Braille cell. The tactile pin cap serves to position and align the pins, and provides the cursor control buttons. The Braille cells and associated tactile pins caps positioned adjacent to each other establish the tactile surface. The use of individual cell caps for each Braille cell increases the manufacturing cost and the cost of materials. Additional stabilizers are necessary to position and align the individual cell caps. Strict tolerances are required to provide an acceptable tactile feel for the reader. The reader is sensitive to the separation that is inherent between each cell with this design. This unevenness between each cell plagues all Braille displays known in the prior art. To tactile users, the tactility of the grooves and cell-to-cell unevenness is comparative to the noise or flicker on a computer monitor experienced by a visual user. Additionally, maintenance and replacement of the individual tactile pins is often necessary. Contaminants that build up on the pins must be removed or the pins must be replaced upon excessive wear.

Accordingly, there is a need in the art for an improved electromechanical tactile cell for use in a refreshable Braille display. Improvements in manufacturability and repair are necessary in addition to enhancements in the tactile experience of the user. There is a need for an improved means for securing the piezoelectric reeds to the printed circuit board and establishing the necessary electrical connections. There is additionally a need for an improved alignment procedure for the individual cells that enhances the user interface and allows for easy maintenance of the tactile pins.

However, in view of the prior art considered as a whole at the time the present invention was made, it was not obvious to those of ordinary skill in this field that the identified improvements should be made nor would it have been obvious as to how to make the improvements if the need for such improvements had been perceived.

SUMMARY OF INVENTION

The longstanding but heretofore unfulfilled need for an improved electromechanical tactile cell is now met by a new, useful, and non-obvious invention. The electromechanical tactile cell assembly in accordance with the present invention provides manufacturing cost reductions, improvements in reliability, and enhancements in the tactile experience for users. The electromechanical tactile cell assembly in accordance with the present invention is useful as an actuator for a refreshable Braille display, a graphic tactile display, or any of a variety of devices in which piezoelectric element reeds are utilized as actuators.

An electromechanical tactile cell assembly in accordance with the present invention, includes a plurality of piezoelectric element reeds, each one of the piezoelectric element reeds being bendable at an elongated end portion when a voltage is applied to the reed, a plurality of conductive fulcrum pins secured to a printed circuit board, and a plurality of multiple element conductive supports secured to a printed circuit board, each multiple element conductive support, in combination with the plurality of conductive fulcrum pins, adapted to secure a plurality of piezoelectric reeds, corresponding to the plurality of conductive fulcrum pins, to the printed circuit board.

The piezoelectric element reed may be characterized as a bimorph, and more particularly may be a parallel polled bimorph. In a particular embodiment, the piezoelectric element reed is a parallel polled bimorph having a top piezoelectric plate, a bottom piezoelectric plate, and a conductive strip positioned between the top plate and the bottom plate and insulated therefrom, the conductive strip extending beyond the top plate and the bottom plate at a first end of the reed. Utilizing the parallel polled bimorph, the piezoelectric element reed is conductively secured to the printed circuit board at a first end of the reed. Additionally, a series polled bimorph is within the scope of the present invention.

According to a particular embodiment, the piezoelectric element reeds are of substantially equal length, and are secured to the printed circuit board in a stepped pattern in a common bending plane.

The plurality of multiple element conductive supports secured to the printed circuit board further include a conductive base, and a plurality of conductive flexion members integral to the conductive base. A variety of designs of the multiple element conductive support are effective in meeting the requirements of providing support and an electrical connection to one side of the bimorph reed. In a preferred embodiment, the plurality of conductive flexion members further comprises an arm including a substantially convex portion, the convex portion being biased in a direction to contact the piezoelectric element reed. The flexion members may be positioned in a stepped pattern relative to the conductive base. Accordingly, the piezoelectric element reeds are positioned between the flexion member and the conductive fulcrum pin to secure them to the printed circuit board and provide the required electrical connections. With this embodiment, the flexion member is in contact with a first electrical contact surface coincident with the top plate and the conductive fulcrum pin is in contact with a second electrical contact surface coincident with the bottom plate of the bimorph. Alternatively, the flexion member may contact the bottom plate and the conductive fulcrum pin may contact the top plate of the bimorph.

In a particular embodiment of the electromechanical tactile cell assembly in accordance with the present invention for use in a Braille display, the plurality of conductive fulcrum pins includes a first plurality of fulcrum pins secured to a first side of the printed circuit board and a second plurality of fulcrum pins secured to a second side of the printed circuit board, and the plurality of multiple element conductive supports includes a first plurality of multiple element conductive supports secured to the first side of the printed circuit board and a second plurality of multiple element conductive supports secured to the second side of the printed circuit board. With this design, six or eight tactile pins of a Braille display can be actuated utilizing both sides of the printed circuit board to present Braille text to a user.

According to another embodiment, an electromechanical tactile cell assembly is provided including a plurality of piezoelectric elements, a plurality of multiple element conductive supports conductively securing the plurality of piezoelectric elements to a printed circuit board, and a plurality of pin elements secured to the printed circuit board. Each of the plurality of pin elements is slightly offset from a corresponding one of the plurality of multiple element conductive supports thereby creating a fulcrum. Each of the plurality of pin elements, in combination with the corresponding one of the plurality of multiple element conductive supports is adapted to conductively secure the plurality of piezoelectric elements to the printed circuit board. In a specific embodiment, the pin is offset from the conductive support by about 0.2 mm, thereby creating a fulcrum force to bias the bimorph towards the conductive support.

In an additional embodiment, the electromechanical tactile cell includes a removable piezoelectric element negative stop assembly. In an electromechanical tactile cell assembly used to actuate a plurality of tactile pins, a positive stop exists to limit the extension of the pin above the tactile surface. The positive stop is provided by a ridge on the tactile pin positioned at a specific location that abuts against the underside of the tactile surface to limit the extension above the plane. Additionally, a negative stop is need when a driving voltage is applied to the element reed to retract the pin. This negative stop also serves to reduce the noise and vibration associated with the movement of the reeds. In accordance with the present invention, the negative stop is provided by a removable, nonconductive stop. The removable negative stop assembly further comprises a plurality of negative stop elements corresponding to each of a plurality of piezoelectric elements, the plurality of negative stop elements integral with the removable negative stop assembly. The negative stop assembly is fabricated of an insulative material and positioned proximate to the elongated end portion of the plurality of piezoelectric element reeds. The negative stop assembly is characterized as having a thin cylindrical portion, followed by a disc shaped portion, followed by another cylindrical portion and an additional disc shaped portion, and continuing to provide a disc shape portion positioned between each of the piezoelectric element reeds. The negative stop assembly is removable, thereby eliminating the additional manufacturing cost of molding the downward stop into a plastic assembly. The downward stop is additionally effective in controlling the piezoelectric element reeds not to be displaced by impact or the like to such an extent that the piezoelectric element reeds are broken by their own displacement.

When employed in a refreshable Braille display, the electromechanical tactile cell assemblies are mounted in a frame. In a particular embodiment, twenty Braille cells are mounted in a hollow frame structure. Each Braille cell includes eight bimorph reeds, such that each Braille cell is effective in presenting a Braille letter to the user. The Braille cell further includes a bus connector adapted to secure the Braille cell assembly to the frame and provide electrical connectivity. In a particular embodiment, a serial to parallel converter in circuit communication with the bus connector in included to receive serial input data from the bus connector for actuation of the plurality of piezoelectric element reeds.

To provide the tactile presentation of the Braille letters to the user, a plurality of tactile pins, each of the plurality of tactile pins corresponding to each of the plurality of piezoelectric elements reeds are provided. The tactile pins are vertically movable, in response to a bending movement of a corresponding one of the plurality of piezoelectric element reeds. With this embodiment, the tactile pins are not required as part of the Braille cell assembly. While prior art methods may be used wherein an individual tactile pin cap is provided for each Braille cell, the present invention provides a solution whereby the tactile pins corresponding to a plurality of Braille cell assemblies may be contained in one large tactile pin cap for the entire display. It is within the scope of the invention to provide any number of electromechanical tactile cell assemblies employed in a Braille display or graphic tactile display.

As such, the present invention provides improvements in manufacturability and maintenance of electromechanical tactile cell assemblies. The use of a novel multiple element conductive support and a conductive fulcrum pin eliminates the need for lead wires and hand-solder joints, thereby improving both manufacturability and reliability of the device. Tactile pin maintenance and bimorph reed replacement are greatly simplified with the present invention. Additionally, the present invention enables the use of a tactile pin cap for multiple Braille cell assemblies, thereby eliminating the separation between each cell that is detectable by a user and considered undesirable. The user is presented with a smooth tactile surface presenting protuberants only for the tactile pins and the cursor positioning buttons as desired. The tactile cell assemblies in combination with the bused frame and the novel tactile pin cap for multiple cells enables self-alignment of the cells, thereby eliminating the additional alignment and securing requirements of the prior art.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
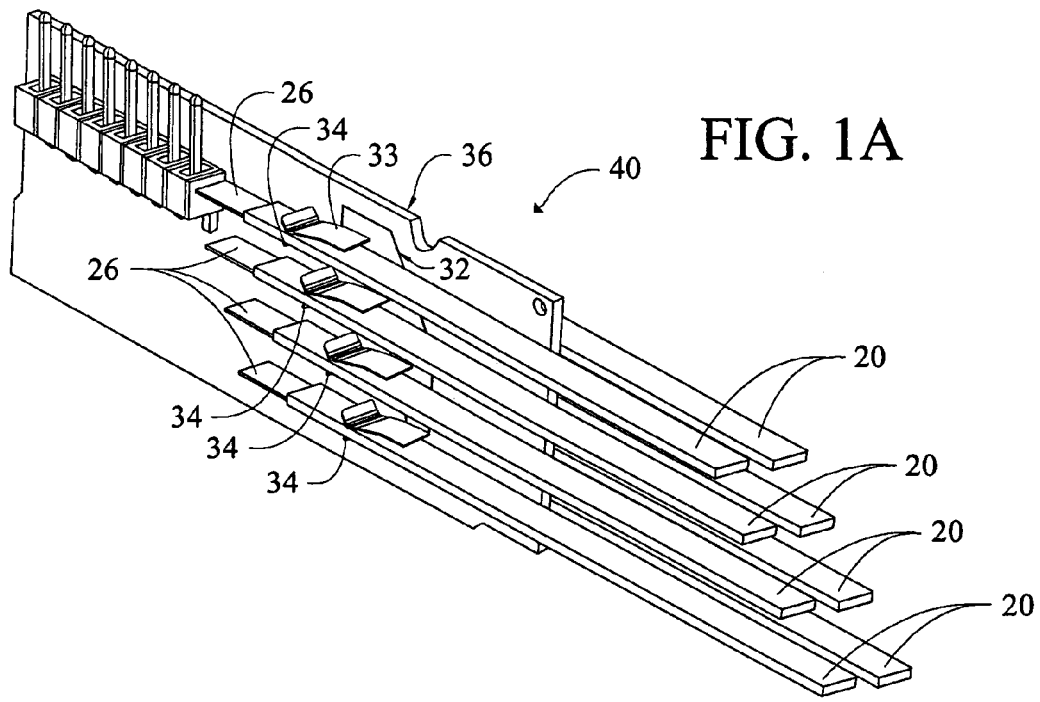
FIG. 1A is a perspective view of a first side of the novel electromechanical tactile cell in accordance with the present invention.
Figure 1B:
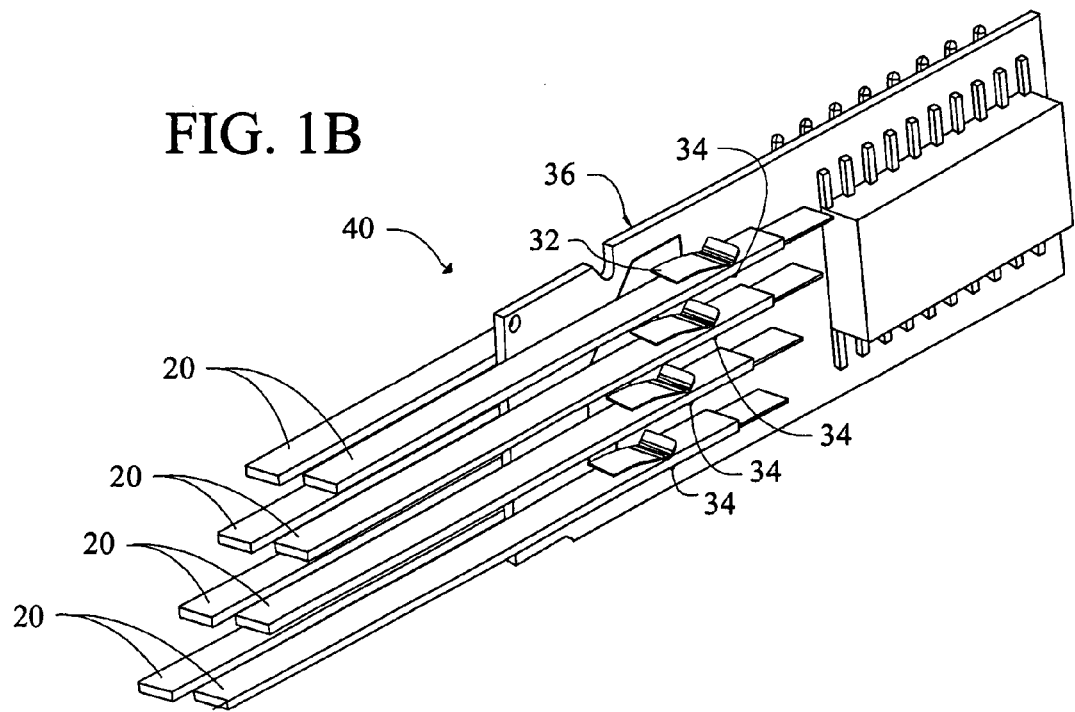
FIG. 1B is a perspective view of a second side of the novel electromechanical tactile cell in accordance with the present invention.

Referring now to FIGS. 1A and 1B there are shown perspective views of opposite sides of an electromechanical tactile cell 40 incorporating features of the present invention. While alternations are possible to the number and placement of bimorph reeds 20 without departing from the invention, FIGS. 1A and 1B illustrate an embodiment in which eight reeds 20 are conductively secured to a printed circuit board 36, four on each side. The reeds are held in place using a multiple element conductive support 32 in combination with a conductive fulcrum pin 34. In addition to securing the piezoelectric reed to the printed circuit board, these support elements also provide electrical contact and assist with proper alignment of the reeds. To reduce manufacturing costs, the multiple element conductive support 32 and the conductive fulcrum pin 34 are adapted for surface mount technology to be placed on the printed circuit using automated placement equipment. The piezoelectric reeds are then inserted between the support and the pin either individually or with the assistance of an alignment jig. The use of a fulcrum pin 34 provides improvements in positioning for calibration of the assembly. In this embodiment, the support 32 and the fulcrum pins 34 are positioned such that the placement of the reeds 20 results in a stairstep pattern. The conductive extension of the bimorph reed 26 are then soldered to a pad on printed circuit board completing the necessary electrical connections to operate the piezoelectric reed as an actuator. To assist in alignment of the reeds, an alignment fixture can be used to accurately control the position of the work end of the bimorph.

In the embodiment shown in FIGS. 1A and 1B, the piezoelectric reed 20 is a parallel polled bimorph. As such, the element includes is a parallel polled bimorph having a top piezoelectric plate, a bottom piezoelectric plate, and a conductive strip positioned between the top plate 10 and the bottom plate 15 and insulated therefrom, the conductive strip 26 extending beyond the top plate 10 and the bottom plate 15 at a first end of the reed 26. It is known that parallel polled bimorphs provide greater deflection with less power and improved efficiency. The reeds utilized herein are electrically polarized for parallel operation at the time of manufacturing by the application of a high voltage the conductive layers. In an exemplary embodiment, a source of relatively high voltage, as of +200V is applied to the multiple element conductive support 32, which is connected to the top plate 10 of the bimorph the bottom plate 15 is connected to ground, through the conductive fulcrum pin 34. The voltage level at the central conductor 26 is then switched between the high positive ground potential and the ground potential, which places the full 200V across the lower piezoelectric layer, or across the upper piezoelectric layer, as determined by the state of the central conductor. When the positive potential is presented across the upper piezoelectric plate, the reed is deflected upward and conversely when the positive potential is applied across the lower piezoelectric layer the reed is deflected downward. In the case of a Braille or graphic tactile display the deflection of the reed moves a corresponding tactile pin up or down to provide the pattern of a Braille character to a user. With the bimorph operated in this manner, the operating voltages are applied in the direction in which the layers were permanently polarized. Accordingly, depolarization of the reeds with continued usage does not occur.

Figure 2:
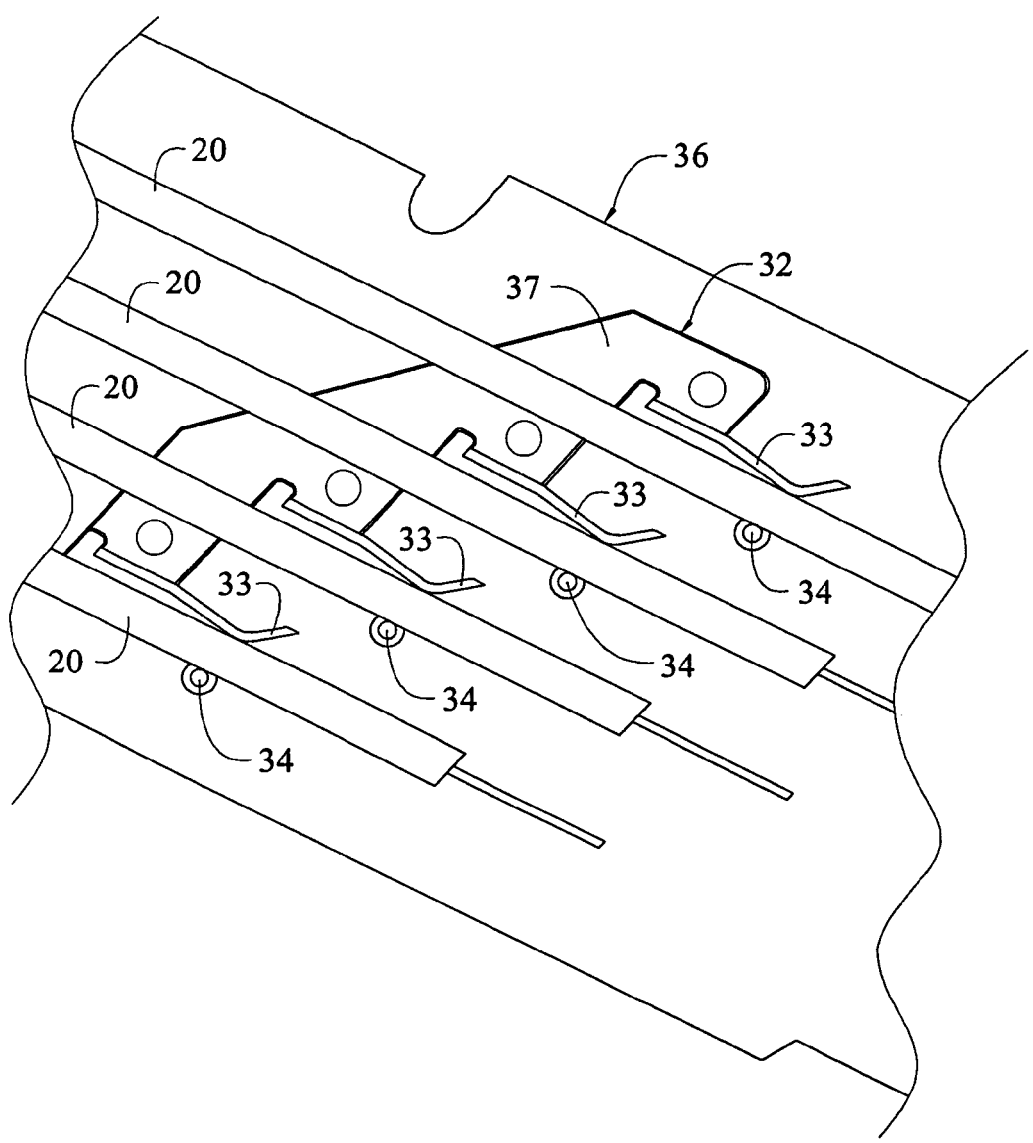
FIG. 2 is a detailed perspective view of the multiple element conductive support and conductive fulcrum pin in accordance with the present invention.

As depicted in the detail of FIG. 2, the plurality of multiple element conductive supports 32 secured to the printed circuit board 36 further include a conductive base 37, and a plurality of conductive flexion members 33 integral to the conductive base 37. A variety of designs of the multiple element conductive support are effective in meeting the requirements of providing support and an electrical connection to one side of the bimorph reed. In a preferred embodiment, the plurality of conductive flexion members 33 further comprises an arm including a substantially convex portion, the convex portion being biased in a direction to contact the piezoelectric element reed. The flexion members 33 may be positioned in a stepped pattern relative to the conductive base 37. Accordingly, the piezoelectric element reeds 20 are positioned between the flexion member 33 and the conductive fulcrum pin 34 to secure them to the printed circuit board 36 and provide the required electrical connections. With this embodiment, the flexion member 33 is in contact with a first electrical contact surface coincident with the top plate and the conductive fulcrum pin is in contact with a second electrical contact surface coincident with the bottom plate of the bimorph. Alternatively, the flexion member may contact the bottom plate and the conductive fulcrum pin may contact the top plate of the bimorph. The distance between the convex portion of the flexion member 33 and the fulcrum pin 34 is slightly less than the thickness of a bimorph reed 20. Each flexion member 33 is formed of an electrically conductive flexible and resilient material so that a bimorph reed 20 disposed in sandwiched relation there between is firmly engaged thereby.

Figure 3:
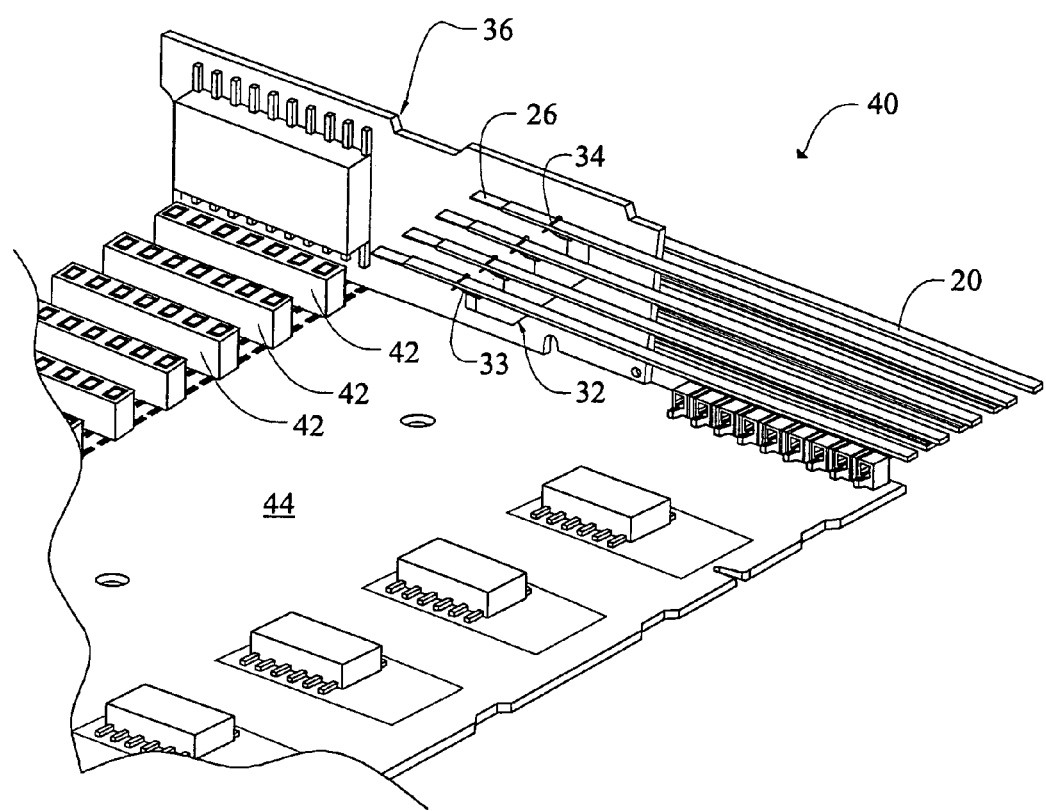
FIG. 3 is a perspective view depicting the interconnection between an electromechanical tactile cell in accordance with the present invention and a frame.

Referring now to FIG. 3, the electromechanical tactile cell 40 in accordance with the present invention is illustrated as positioned in a frame or housing 44. A plurality of receiving sockets 42 are positioned on the frame 44 in spaced relation to one another as depicted. With this configuration, a large number of tactile cells 40 can be mounted within the frame 44. A connector positioned on each of the tactile cells secures the tactile cell 40 to the frame 44 at the receiving socket 42. A serial to parallel integrated circuit may be used to receive the input from the computer and provide the output to the piezoelectric elements as required.

Figure 4:
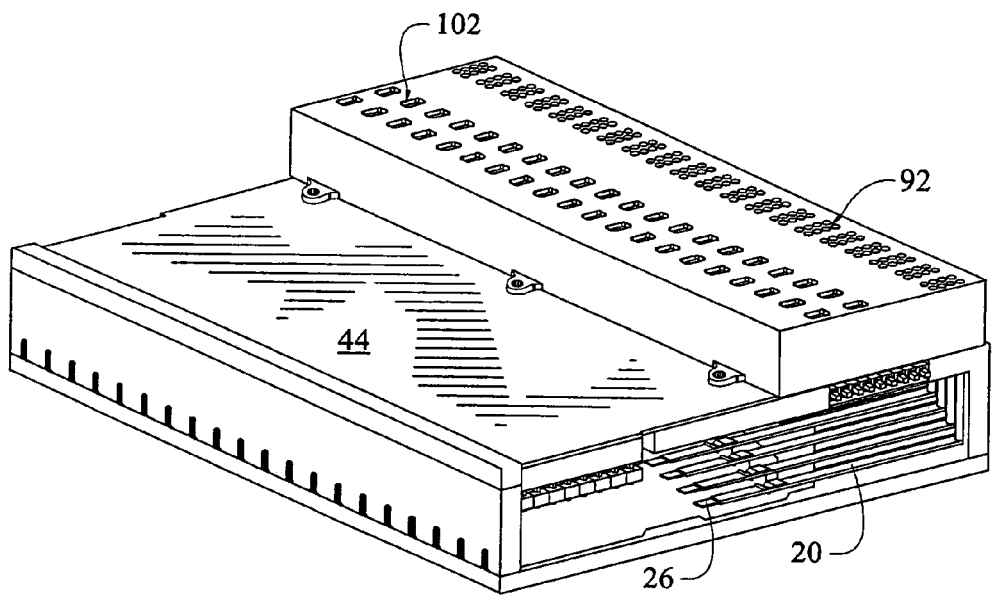
FIG. 4 is a perspective view of the refreshable Braille display.

As shown in FIG. 4, the electromechanical tactile cells 40, employed as Braille cells, of the present invention are shown as assembled in a refreshable Braille display 100. As shown, the cells are positioned within the frame and held in place utilizing receiving connectors 42. Refreshable Braille displays often include a router button that allows control over the position of the text cursor. Pressing the router button of a particular cell will move the cursor over that particular letter of the text. The receiving connectors 42 provide electrical communication between the Braille cells 40 and the cursor routing buttons 102 through a backplane. Prior art devices require that lead wires be run from the button switches to the printed circuit board of the Braille cell to provide operation of the cursor controls.

The Braille cell of the present invention does not include an individual tactile pin cap for each cell. As shown in FIG. 4, a monolithic cell cap 90 is provided to replace the individual tactile pin caps. The cell cap 90 provides a smooth tactile surface for the user, eliminating the spaces between adjacent individual tactile pin caps. The use of a monolithic cell cap also eliminates the need for alignment hardware and fixing plates associated with the individual tactile pin caps. The cell cap provides for self-alignment of the Braille cells.

Figure 5A:
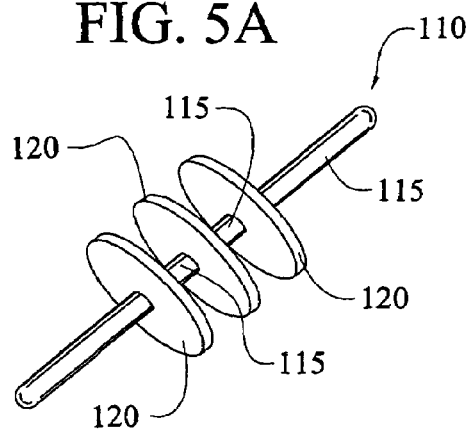
FIG. 5A is a perspective view of the removable downward stop for use with the electromechanical tactile cell.
Figure 5B:
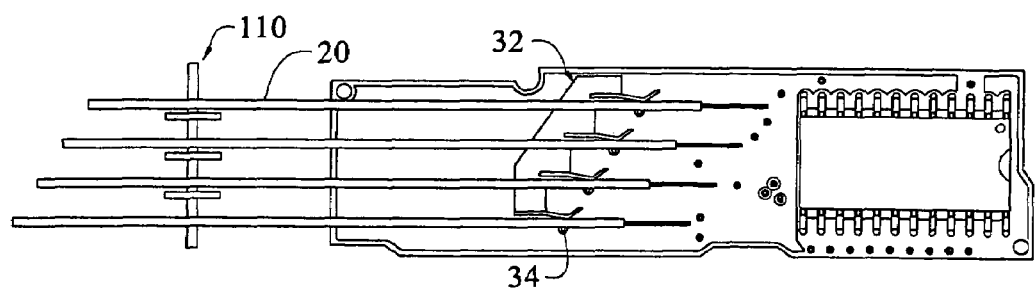
FIG. 5B is a side view of the removable downward stop for use with the electromechanical tactile cell.

As shown with reference to FIGS. 5A and 5B, in an additional embodiment, the electromechanical tactile cell includes a removable downward stop 110. In accordance with the present invention, the negative stop is provided by a removable, nonconductive stop. The removable negative stop assembly further comprises a plurality of negative stop elements corresponding to each of a plurality of piezoelectric elements, the plurality of negative stop elements integral with the removable negative stop assembly 110. The negative stop assembly is fabricated of an insulative material and positioned proximate to the elongated end portion of the plurality of piezoelectric element reeds as shown in FIG. 5B. As illustrated in FIG. 5A, the negative stop assembly is characterized as having a thin cylindrical portion 115, followed by a disc shaped portion 120, followed by another cylindrical portion 115 and an additional disc shaped portion 120, and continuing to provide a disc shape portion positioned between each of the piezoelectric element reeds. The negative stop assembly is removable, thereby eliminating the additional manufacturing cost of molding the downward stop into a plastic assembly. The downward stop is additionally effective in controlling the piezoelectric element reeds not to be displaced by impact or the like to such an extent that the piezoelectric element reeds are broken by their own displacement.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described, What is claimed is:

1. An electromechanical tactile cell assembly comprising:
   a plurality of piezoelectric element reeds, each one of the piezoelectric element reeds being bendable at an elongated end portion when a voltage is applied to the reed;
   a plurality of conductive fulcrum pins secured to a printed circuit board; and
   a plurality of multiple element conductive supports secured to a printed circuit board, each multiple element conductive support, in combination with the plurality of conductive fulcrum pins, adapted to secure a plurality of piezoelectric reeds, corresponding to the plurality of conductive fulcrum pins, to the printed circuit board.

2. The electromechanical tactile cell assembly of claim 1, wherein the piezoelectric element reed is a bimorph.

3. The electromechanical tactile cell assembly of claim 1, wherein the piezoelectric element reed is a parallel polled bimorph.

4. The electromechanical tactile cell assembly of claim 1, wherein the piezoelectric element reed is a series polled bimorph.

5. The electromechanical tactile cell assembly of claim 1, wherein the piezoelectric element reed further comprises a top piezoelectric plate, a bottom piezoelectric plate, and a conductive strip positioned between the top plate and the bottom plate and insulated therefrom, the conductive strip extending beyond the top plate and the bottom plate at a first end of the reed.

6. The electromechanical tactile cell assembly of claim 5, wherein the piezoelectric element reed is conductively secured to the printed circuit board at a first end of the reed.

7. The electromechanical tactile cell assembly of claim 1, wherein the piezoelectric element reeds are of substantially equal length, and wherein the piezoelectric element reeds are secured to the printed circuit board in a stepped pattern in a common bending plane.

8. The electromechanical tactile cell assembly of claim 1, wherein the plurality of multiple element conductive supports further comprises:
   a conductive base; and
   a plurality of conductive flexion members integral to the conductive base.

9. The electromechanical tactile cell assembly of claim 8, wherein the plurality of conductive flexion members further comprises an arm including a substantially convex portion, the convex portion biased in a direction to contact the piezoelectric element reed.

10. The electromechanical tactile assembly of claim 8, wherein the plurality of conductive flexion members are arranged in a stepped pattern relative to the conductive base.

11. The electromechanical tactile cell assembly of claim 5, further comprising a first electrical contact surface coincident with the top plate and a second electrical contact surface coincident with the bottom plate.

12. The electromechanical tactile cell assembly of claim 11, wherein each multiple element conductive support is in contact with the first electrical contact surface and each of the plurality of conductive fulcrum pins is in contact with the second electrical contact surface, such that the piezoelectric reed is secured to the printed circuit board.

13. The electromechanical tactile cell assembly of claim 11, wherein each multiple element conductive support is in contact with the second electrical contact surface and each of the plurality of conductive fulcrum pins is in contact with the first electrical contact surface, such that the piezoelectric reed is secured to the printed circuit board.

14. The electromechanical tactile cell assembly of claim 1, further comprising:
   the plurality of conductive fulcrum pins includes a first plurality of fulcrum pins secured to a first side of the printed circuit board and a second plurality of fulcrum pins secured to a second side of the printed circuit board; and the plurality of multiple element conductive supports includes a first plurality of multiple element conductive supports secured to the first side of the printed circuit board and a second plurality of multiple element conductive supports secured to the second side of the printed circuit board.

15. The electromechanical tactile cell assembly of claim 1, further comprising a removable piezoelectric element negative stop assembly.

16. The electromechanical tactile cell assembly of claim 15, wherein the removable negative stop assembly further comprises a plurality of negative stop elements corresponding to each of a plurality of piezoelectric elements, the plurality of negative stop elements integral with the removable negative stop assembly.

17. The electromechanical tactile cell assembly of claim 15, wherein the removal piezoelectric element negative stop is fabricated of an insulative material.

18. The electromechanical tactile cell assembly of claim 15, wherein the removable piezoelectric element negative stop is positioned proximate to the elongated end portion of the plurality of piezoelectric element reeds.

19. The electromechanical tactile assembly of claim 16, wherein the removable negative stop assembly further comprises a first thin cylindrical portion and first disc portion, a second cylindrical portion and a second disc portion, a third cylindrical portion and a third disc portion and a fourth cylindrical portion, such that the disc portions are positionable between the piezoelectric element reeds.

20. The electromechanical tactile cell assembly of claim 1, further comprising:

a bus connector adapted to secure the Braille cell assembly to a frame; and a serial to parallel converter in circuit communication with the bus connector, to receive serial input data from the bus connector for actuation of the plurality of piezoelectric element reeds.

21. The electromechanical tactile cell assembly of claim 1, further comprising:

a plurality of tactile pins, each of the plurality of tactile pins corresponding to each of the plurality of piezoelectric elements reeds; and a respective one of the plurality of tactile pins being vertically movable, in response to a bending movement of a corresponding one of the plurality of piezoelectric element reeds.

22. The electromechanical tactile cell assembly of claim 21, wherein the movement of the plurality of tactile pins provides a tactile Braille display.

23. An electromechanical tactile cell assembly comprising:

a plurality of piezoelectric elements;

a plurality of multiple element conductive supports conductively securing said plurality of piezoelectric elements to a printed circuit board; and a plurality of pin elements secured to the printed circuit board, each of said plurality of pin elements slightly offset from a corresponding one of said plurality of multiple element conductive supports thereby creating a fulcrum, each of said plurality of pin elements, in combination with the corresponding one of said plurality of multiple element conductive supports adapted to conductively secure said plurality of piezoelectric elements to the printed circuit board.

24. The electromechanical tactile cell assembly of claim 23, wherein the offset is about 0.22 mm.

* * * * *